United States Patent
Nellen et al.

(10) Patent No.: US 8,960,782 B2
(45) Date of Patent: Feb. 24, 2015

(54) DRIVE MECHANISM AND OPEN ROOF CONSTRUCTION PROVIDED THEREWITH

(71) Applicant: Inalfa Roof Systems Group B.V., Venray (NL)

(72) Inventors: Marcel Johan Christiaan Nellen, Merselo (NL); Ruud Geurts, Helden (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/032,482

(22) Filed: Sep. 20, 2013

(65) Prior Publication Data

US 2014/0084637 A1 Mar. 27, 2014

(30) Foreign Application Priority Data

Sep. 25, 2012 (EP) .................................... 12185813

(51) Int. Cl.
*B60J 7/047* (2006.01)
*B60J 7/057* (2006.01)
*B60J 7/02* (2006.01)

(52) U.S. Cl.
CPC ... *B60J 7/057* (2013.01); *B60J 7/02* (2013.01)
USPC .................. 296/216.08; 296/223; 296/216.03

(58) Field of Classification Search
CPC .................................... B60J 7/02; B60J 7/057
USPC ............................................. 296/216.01–224
See application file for complete search history.

(56) References Cited

U.S. PATENT DOCUMENTS

| 4,671,565 | A  * | 6/1987 | Grimm et al. ............. 296/216.04 |
| 8,459,730 | B2 * | 6/2013 | Sawada et al. ................ 296/223 |
| 2006/0012224 | A1 | 1/2006 | Boehm et al. |
| 2011/0233971 | A1 * | 9/2011 | Nellen et al. .................. 296/222 |
| 2012/0068503 | A1 | 3/2012 | Uehara et al. |

FOREIGN PATENT DOCUMENTS

| EP | 1616738 B1 | 7/2007 |
| EP | 2433829 | 3/2012 |
| FR | 2917337 A1 | 12/2008 |

OTHER PUBLICATIONS

European Search Report from The Hague in corresponding foreign EP12185813 filed Sep. 25, 2012.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A drive mechanism includes a guide channel and a slide shoe. The guide channel comprises a first part extending in a substantially horizontal direction for moving the shoe on a first level, and a second part extending downwardly relative to the horizontal direction for moving the shoe to a lower second level. A drive member attaches to the shoe and extends along the channel, substantially parallel to the first part. The guide channel defines two spaced guide channel parts cooperating with two corresponding slide shoe parts. The slide shoe between its spaced slide shoe parts includes a recess allowing the slide shoe to move from the first to the second level without engaging the drive member. The drive member is located within the vertical projection at a level above the level assumed by at least one of the slide shoe parts when the slide shoe is at its second level.

15 Claims, 3 Drawing Sheets

DRIVE MECHANISM AND OPEN ROOF CONSTRUCTION PROVIDED THEREWITH

BACKGROUND

The discussion below is merely provided for general background information and is not intended to be used as an aid in determining the scope of the claimed subject matter.

Aspects of the invention relate to a drive mechanism for an open roof construction of a vehicle, comprising a guide channel and a slide shoe cooperating therewith, which guide channel comprises a first part extending in a substantially horizontal direction for moving the slide shoe on a first level in said substantially horizontal direction, and a second part extending downwardly relative to said substantially horizontal direction for moving the slide shoe to a lower second level, and further comprising an elongate drive member attached to the slide shoe and extending along the guide channel, substantially in parallel to the first part of the guide channel.

For limiting the dimensions of such a drive mechanism (and, consequently, the dimensions of an open roof construction provided therewith) the elongate drive member (which for example may be a push-pull cable) should be positioned as close to the guide channel as possible. However, when positioning the elongate drive member care should be taken that it will not interfere with the slide shoe when latter moves downwardly in the second part of the guide channel from its first level towards the lower second level.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is a drive mechanism characterized in that the guide channel defines two spaced guide channel parts for cooperation with two corresponding slide shoe parts and wherein the slide shoe between its spaced slide shoe parts is provided with a recess allowing the slide shoe to move from the first to the second level without engaging the elongate drive member, which drive member is located within the vertical projection of the guide channel and at a level above the level assumed by at least one of the slide shoe parts when the slide shoe is positioned at its second level.

As a result it is not necessary to position the elongate drive member aside or below the guide channel. The drive mechanism will have smaller dimensions than a state of the art drive mechanism and in the open roof construction there will be more available space, for example for a wider roof opening.

In one embodiment of the drive mechanism, the slide shoe between its slide shoe parts is bridge-shaped. Such a bridge-shaped slide shoe maintains its slide function while allowing to partially move with its spaced slide shoe parts beyond (that means, at least to opposite sides of and possibly below) the elongate drive member.

In one embodiment of the drive mechanism, the slide shoe parts are positioned at the same level, leading to a symmetrical situation. However, it is possible too that the slide shoe parts are positioned at different levels, for example for providing room for another element of the drive mechanism.

In another embodiment of the drive mechanism, the drive member is located substantially in a central vertical plane of the slide shoe. This will lead to a substantially symmetrical drive force acting on the slide shoe, diminishing the risk on distortions and jamming thereof.

However, as an alternative it is conceivable too that the drive member is located at one side of a central vertical plane of the slide shoe. In such a case the slide shoe may have a corresponding asymmetrical shape in which the recess is positioned eccentrically.

In a second aspect the invention relates to an open roof construction for a vehicle, comprising a roof opening in a stationary roof part and a movable panel for closing and at least partially opening said roof opening, which panel is movable by means of at least two drive mechanisms having aspects according to the present invention.

In one embodiment of such an open roof construction the movable panel is a spoiler. However, it is also possible that the movable panel is another type of movable panel, such as for example a wind deflector or a slidable and/or tiltable roof panel.

BRIEF DESCRIPTION OF THE DRAWINGS

Hereinafter aspects of the invention will be elucidated while referring to the drawing, in which.

DETAILED DESCRIPTION OF THE ILLUSTRATIVE EMBODIMENTS

Figure 1:
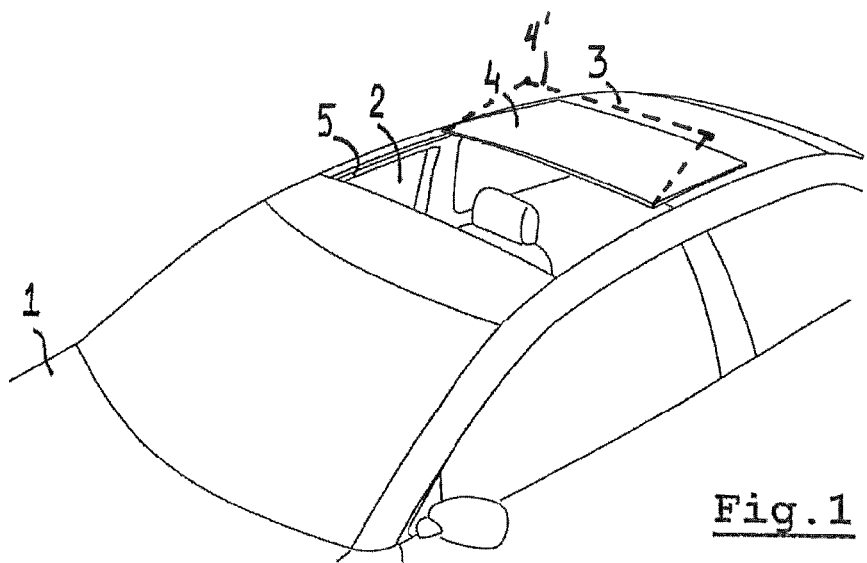
FIG. 1 in a perspective view illustrates part of a vehicle with an open roof construction.

Referring to FIG. 1, a vehicle 1 is shown partly. The vehicle 1 comprises a roof opening 2 in a stationary roof part 3 and a movable panel 4 for closing and at least partially opening said roof opening.

The movable panel 4 may be a spoiler 4' illustrated in dashed lines, a top slider or any other kind of movable panel which carries out a movement by means of at least two drive mechanisms which are located at opposite longitudinal sides of the roof opening 2. Of these drive mechanisms in FIG. 1 only a guide channel 5 at one longitudinal side of the roof opening 2 is visible.

Figure 2:
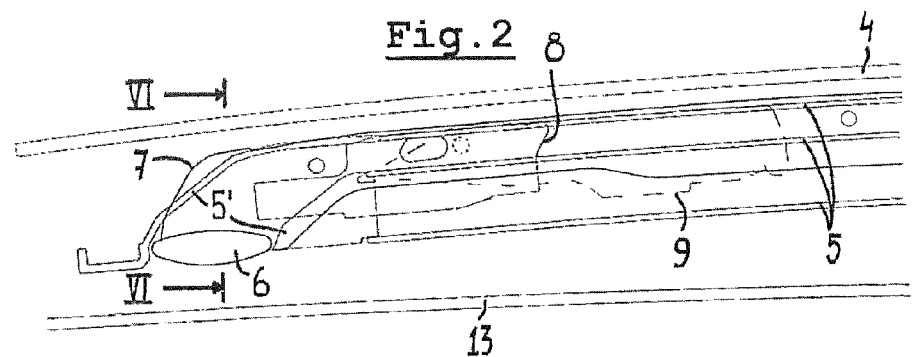
FIGS. 2-4 show successive stages during the operation of a drive mechanism.
Figure 3:
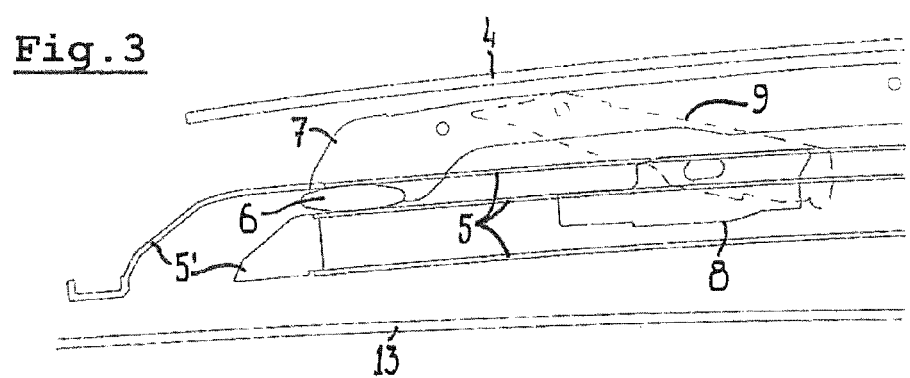
Figure 4:
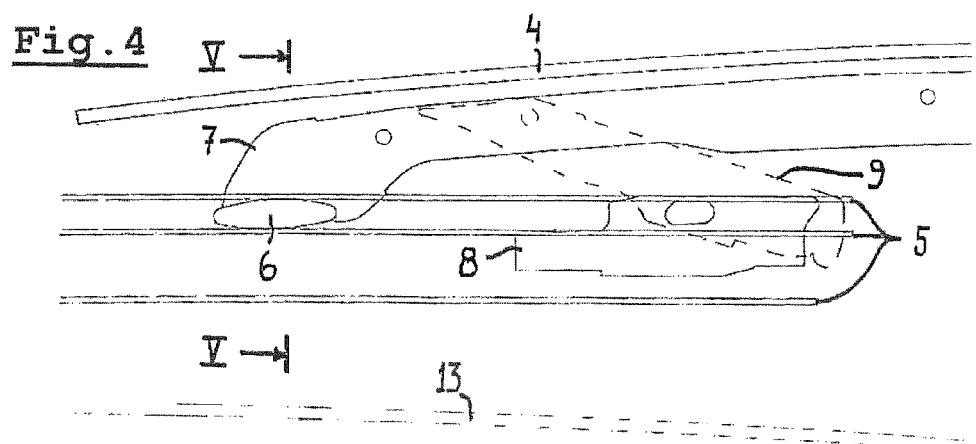

FIGS. 2-4 more clearly show parts of such a drive mechanism. Within the guide channel 5 a slide shoe 6 is positioned cooperating therewith in a manner known per se for offering a bracket 7 attached thereto (and carrying the movable panel 4 in a manner not shown in detail) a desired succession of movements (in the present embodiment in combination with a driven slide 8 and a lever 9, wherein the cooperation between these parts is known per se and has no bearing on the present invention and thus is not detailed here). As a result the movable panel 4 will carry out a desired movement when the slide shoe 6 moves along the guide channel 5.

The guide channel comprises a first part 5 extending in a substantially horizontal direction for moving the slide shoe 6 on a first level in said substantially horizontal direction, and a second part 5' (in the art also referred to as locator) extending downwardly relative to said substantially horizontal direction for moving the slide shoe 6 to a lower second level. In FIG. 2 the slide shoe 6 is located within said second guide channel part (or locator) 5'. In FIGS. 3 and 4, however, the slide shoe 6 is positioned in the substantially horizontally extending part 5 of the guide channel (wherein FIG. 3 represents a partly opened position of the movable panel 4 and FIG. 4 represents a fully opened position thereof).

Figure 5:
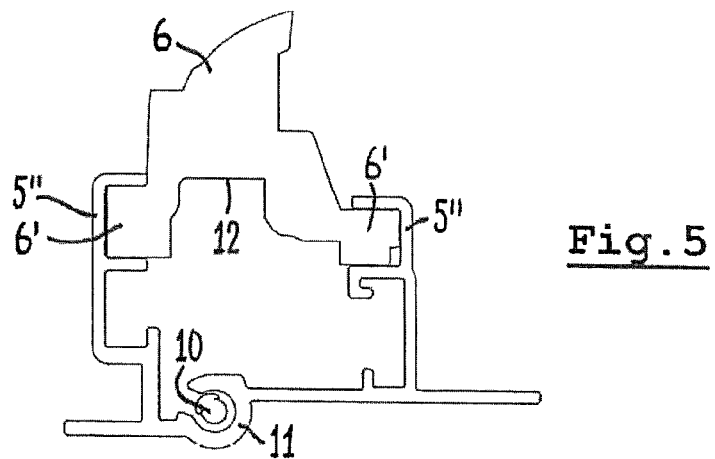
FIG. 5 shows a section according to V-V in FIG. 4.
Figure 6:
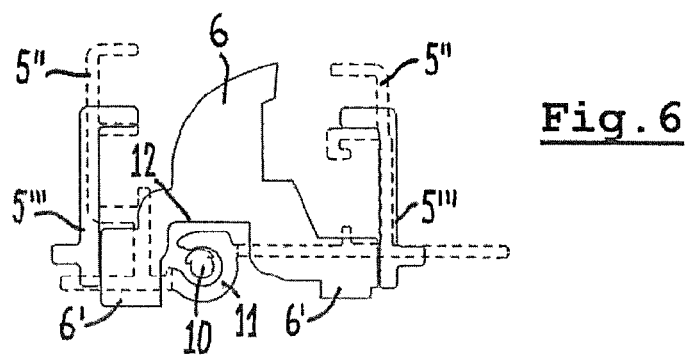
FIG. 6 shows a section according to VI-VI in FIG. 2.

As will appear more clearly from FIGS. 5 and 6, the drive mechanism further comprises an elongate drive member 10 attached to the slide shoe 6 and extending along the guide channel 5 (or, as clearly illustrated in FIGS. 5 and 6, in a channel 11 being an integral part of the guide channel 5), substantially in parallel to the first part 5 of the guide channel. This elongate drive member, which for example may comprise a push-pull cable, is driven by any kind of driving force (caused, for example, by an electric motor or manually by an operator).

Referring to FIGS. 5 and 6, it appears that the guide channel defines two transversely spaced guide parts 5" (in the substantially horizontally extending first guide channel part 5) and 5''' (in the downwardly extending second guide channel part 5') for cooperation with two corresponding slide shoe parts 6'. As best shown in FIG. 5, the slide shoe 6 between its spaced slide shoe parts 6' is provided with a recess 12, which in the present embodiment is bridge-shaped. Such a recess allows the slide shoe 6 to move from the first level (in the first guide channel part 5) to the second level (in the second guide channel part, or locator, 5') without engaging the elongate drive member 10. As a result the drive member may be located within the vertical projection of the guide channel 5 and at a level above the level assumed by the lowest part of (at least one of) the slide shoe parts 6' when the slide shoe 6 is positioned at its second level in the locator (basically this means that the drive member 10 is located within the cross section of the guide channel 5). Thus the dimensions of the drive mechanism may be minimised, compared to the state of the art in which the drive member 10 is located outside of the cross section of the guide channel 5. For example, a headliner 13 (see FIG. 2) may be located at a higher level.

Figure 7:
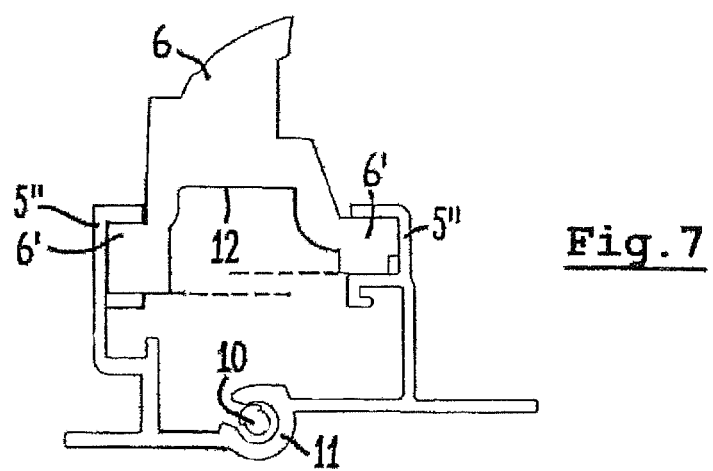
FIG. 7 shows a sectional view of the drive mechanism with slide shoe parts at different levels.

Although in the illustrated embodiment of the drive mechanism the slide shoe parts 6' are positioned at the same level (FIG. 5), it is conceivable too that these slide shoe parts 6' are positioned at different levels as illustrated in FIG. 7. As illustrated in FIGS. 5 and 6 the slide shoe 6 has an asymmetrical shape in which the recess 12 is positioned eccentrically (thus the drive member 10 is located at one side of a central vertical plane of the slide shoe 6). As illustrated in FIG. 7, the drive member 10 is located substantially in a central vertical plane of the slide shoe 6 (and, thus, this slide shoe 6 has a more symmetrical shape with a centrally located recess 12).

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A drive mechanism for an open roof construction of 5 a vehicle, comprising a guide channel and a slide shoe cooperating therewith, which guide channel comprises a vertical projection and a first part extending in a substantially horizontal direction configured to move the slide shoe on a first level in said substantially horizontal direction, and a second part extending downwardly relative to said substantially horizontal direction configured to move the slide shoe to a lower second level, and further comprising an elongate drive member attached to the slide shoe and extending along the guide channel, substantially in parallel to the first part of the guide channel, wherein the guide channel defines two spaced guide channel parts for cooperation with two corresponding slide shoe parts and wherein the slide shoe between the spaced slide shoe parts is provided with a recess allowing the slide shoe to move from the first to the second level without engaging the elongate drive member, which drive member is located within the vertical projection of the guide channel and substantially in a central vertical plane of the slide shoe and at a level above the level assumed by at least one of the slide shoe parts when the slide shoe is positioned at the second level.

2. The drive mechanism according to claim 1, wherein the slide shoe between the slide shoe parts is bridge-shaped.

3. The drive mechanism according to claim 2, in which the slide shoe parts are positioned at the same level.

4. The drive mechanism according to claim 1, in which the slide shoe parts are positioned at the same levels.

5. The drive mechanism according to claim 1, in which the slide shoe parts are positioned at different levels.

6. The drive mechanism according to claim 2, in which the slide shoe parts are positioned at different levels.

7. The drive mechanism according to claim 1, wherein the drive member is located at one side of a central vertical plane of the slide shoe.

8. The drive mechanism according to claim 7, wherein the slide show has an asymmetrical shape in which the recess is positioned eccentrically.

9. An open roof construction for a vehicle, comprising a roof opening in a stationary roof part, a movable panel for closing and at least partially opening said roof opening, and two drive mechanisms connected to the movable panel on each of two opposite sides of the movable panel, each drive mechanism comprising a guide channel and a slide shoe cooperating therewith, which guide channel comprises a vertical projection and a first part extending in a substantially horizontal direction configured to move the slide shoe on a first level in said substantially horizontal direction, and a second part extending downwardly relative to said substantially horizontal direction configured to move the slide shoe to a lower second level, and further comprising an elongate drive member attached to the slide shoe and extending along the guide channel, substantially in parallel to the first part of the guide channel, wherein the guide channel defines two spaced guide channel parts for cooperation with two corresponding slide shoe parts and wherein the slide shoe between the spaced slide shoe parts is provided with a recess allowing the slide shoe to move from the first to the second level without engaging the elongate drive member, which drive member is located within the vertical projection of the guide channel and substantially in a central vertical plane of the slide shoe and at a level above the level assumed by at least one of the slide shoe parts when the slide shoe is positioned at the second level.

10. The open roof construction according to claim 9, wherein the movable panel is a spoiler.

11. The open roof construction according to claim 10, wherein each of the slide shoes between the associated slide shoe parts is bridge-shaped.

12. The open roof construction according to claim 10, in which the slide shoe parts are positioned at the same level.

13. The open roof construction according to claim 10, in which the slide shoe parts are positioned at different levels.

14. The open roof construction according to claim 10, wherein the drive member is located at one side of a central vertical plane of the slide shoe.

15. The open roof construction according to claim 14, wherein the slide shoe has an asymmetrical shape in which the recess is positioned eccentrically.

* * * * *